US007200645B2

(12) United States Patent
Brown et al.

(10) Patent No.: US 7,200,645 B2
(45) Date of Patent: Apr. 3, 2007

(54) RUNNING DYNAMIC WEB PAGES OFF-LINE WITH A WIZARD

(75) Inventors: Michael Wayne Brown, Georgetown, TX (US); Jerry Walter Malcolm, Austin, TX (US); Aaron Keith Reed, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/183,772

(22) Filed: Jun. 26, 2002

(65) Prior Publication Data
US 2004/0003031 A1 Jan. 1, 2004

(51) Int. Cl.
G06F 15/13 (2006.01)
(52) U.S. Cl. .................... 709/219; 709/203; 709/217; 709/227
(58) Field of Classification Search ................ 709/203, 709/217, 219, 227
See application file for complete search history.

(56) References Cited

U.S. PATENT DOCUMENTS

| | | | |
|---|---|---|---|
| 5,740,430 | A | 4/1998 | Rosenberg et al. |
| 5,784,562 | A | 7/1998 | Diener |
| 5,799,285 | A | 8/1998 | Klingman |
| 5,838,916 | A * | 11/1998 | Domenikos et al. ........ 709/219 |
| 5,892,909 | A | 4/1999 | Grasso et al. |
| 5,893,116 | A | 4/1999 | Simmonds et al. |

(Continued)

FOREIGN PATENT DOCUMENTS

DE 19942432 A1 6/1999

(Continued)

OTHER PUBLICATIONS

A Distributed Computing Environment for Building Scalable Management Services, IEEE online library, Nikolaos Anerousis, pp. 547-562, May 24-28, 1999.

(Continued)

*Primary Examiner*—Viet D. Vu
*Assistant Examiner*—Jinsong Hu
(74) *Attorney, Agent, or Firm*—Marilyn S. Dawkins; Amy J. Pattillo

(57) ABSTRACT

A wizard is utilized when running a server-based transactional Web page application. The wizard tracks the interdependencies of the Web pages, any data accesses required for any of the Web pages, and any rules for presenting a different sequence of Web pages based upon differing aspects of anticipated user input. The wizard is used to access the required data if a user selection is made to download the application and run the application off-line at a client that is disconnected from the network. To run off-line, the applicable Web pages, the wizard, and the required data are downloaded to the client. When running off-line, the wizard plays back the downloaded pages of the application in a sequence dependent upon the tracked interdependencies and received user input. As such, the wizard controls the dynamic presentation of the downloaded pages and provides the required data to enable the transactional pages of the application to be completed. The wizard, in conjunction with a browser running at the client, automatically submits the completed Web pages of the application to the server when the client is reconnected to the network.

36 Claims, 11 Drawing Sheets

U.S. PATENT DOCUMENTS

| | | | |
|---|---|---|---|
| 5,974,572 | A | 10/1999 | Weinberg et al. |
| 5,983,227 | A | 11/1999 | Nazem et al. |
| 6,026,417 | A | 2/2000 | Ross et al. |
| 6,026,433 | A | 2/2000 | D'Arlach et al. |
| 6,035,324 | A * | 3/2000 | Chang et al. ............... 709/203 |
| 6,061,733 | A | 5/2000 | Bodin et al. |
| 6,163,779 | A | 12/2000 | Mantha et al. |
| 6,167,441 | A | 12/2000 | Himmel |
| 6,182,050 | B1 | 1/2001 | Ballard |
| 6,182,122 | B1 * | 1/2001 | Berstis ....................... 709/217 |
| 6,219,680 | B1 | 4/2001 | Bernardo et al. |
| 6,226,648 | B1 | 5/2001 | Appleman et al. |
| 6,237,006 | B1 | 5/2001 | Weinberg et al. |
| 6,243,761 | B1 | 6/2001 | Mogul et al. |
| 6,262,729 | B1 | 7/2001 | Marcos et al. |
| 6,263,352 | B1 | 7/2001 | Cohen |
| 6,275,833 | B1 | 8/2001 | Nakamura et al. |
| 6,285,998 | B1 | 9/2001 | Black et al. |
| 6,304,886 | B1 | 10/2001 | Bernardo et al. |
| 6,308,164 | B1 | 10/2001 | Nummelin et al. |
| 6,308,188 | B1 | 10/2001 | Bernardo et al. |
| 6,330,575 | B1 | 12/2001 | Moore et al. |
| 6,332,134 | B1 | 12/2001 | Foster |
| 6,340,977 | B1 | 1/2002 | Lui et al. |
| 6,345,308 | B1 | 2/2002 | Abe |
| 6,651,217 | B1 | 11/2003 | Kennedy et al. |
| 6,795,830 | B1 | 9/2004 | Banerjee et al. |
| 6,862,612 | B1 | 3/2005 | Horn et al. |
| 2001/0003828 | A1 | 6/2001 | Peterson et al. |
| 2001/0011250 | A1 | 8/2001 | Pattenghe et al. |
| 2001/0027439 | A1 | 10/2001 | Holtzman et al. |
| 2001/0034016 | A1 | 10/2001 | Ziv-el et al. |
| 2001/0039541 | A1 | 11/2001 | Okawa et al. |
| 2001/0056370 | A1 | 12/2001 | Tafla |
| 2002/0004760 | A1 | 1/2002 | Yoshida et al. |
| 2002/0010746 | A1 | 1/2002 | Jilk, Jr. et al. |
| 2002/0013788 | A1 | 1/2002 | Pennell et al. |
| 2002/0023057 | A1 | 2/2002 | Goodwin et al. |
| 2002/0095462 | A1 * | 7/2002 | Beck et al. ................. 709/204 |
| 2002/0095482 | A1 | 7/2002 | Beck et al. |
| 2002/0122060 | A1 | 9/2002 | Markel |
| 2002/0152197 | A1 | 10/2002 | Stocker et al. |
| 2003/0065558 | A1 | 4/2003 | Shaw et al. |
| 2003/0158947 | A1 * | 8/2003 | Bloch et al. ................ 709/227 |
| 2004/0003345 | A1 | 1/2004 | Brown et al. |

FOREIGN PATENT DOCUMENTS

| | | |
|---|---|---|
| JP | 10187456 A | 7/1998 |
| WO | WO 00/42528 | 7/2000 |
| WO | WO 00/70511 | 11/2000 |
| WO | WO01/44988 A1 | 6/2001 |
| WO | WO01/88762 A2 | 11/2001 |

OTHER PUBLICATIONS

The Wurd on Saving Time by Reading News Offline, Feb. 5, 2002. http://www.wurd.com/eng/ABCs/offline_news.html.

Mosaic for X Version 2.0 Fill-Out Form Support, Feb. 5, 2002. http://www.uni-karlsruhe.de/Betrieb/Mosaic/Docs/fill-out-forms/overview.html.

*A Distributed Computing Environment for Building Scalable Management Services*, IEEE online library, Nikolaos Anerousis, pp. 547-562, no date.

*Modeling of HTTP Traffic*, IEEE online library, Eduardo Casilari, et al; 2001, pp. 272-274, no date.

*Receiver Based Management of Low Bandwidth Access Links*, IEEE online library, Neil T. Spring, et al; pp. 245-254, no date.

The WURD on Saving Time by Reading News Offline. //www.wurd.com/eng/ABCs/offline$_{13}$ news.html, no date.

Research Disclosure, Feb. 2001, 442109, Method for disconnected host terminal emulation, pp. 276-277, no date.

IBM Technical Disclosure Bulletin, vol. 26, No. 6, Nov. 1983, A Journal Architecture for A Segmented, Single Level Store, pp. 2908-2911, no date.

Research Disclosure, Sep. 1998, 413121, Using a Template Processor to Simplify Programing, pp. 1272-1273, no date.

IBM Technical Disclosure Bulletin, vol. 40, No. 6, Jun. 1997, Archiving Agent for the World Wide Web, pp. 33-34, no date.

Mosaic for X version 2.0 Fill-Out Form Support, ://www.uni-karlsruhe.de/Betrieb/Mosaic/Docs/fill-out-forms/overview.html, no date.

IBM, Creating and Utilizing a Wizard to Capture an Application's Interdependencies Between Web Pages and Data Accesses for Running the Application's Downloadable Dynamic Web Pages Off-Line, 46 pages, co-pending filing date with IBM, no date.

* cited by examiner

PAYMENT AND SHIPPING

CREDIT CARD NUMBER

NAME ON CREDIT CARD

BILLING ADDRESS

SHIPPING ADDRESS

YOUR TOTAL $63.99 — 356

CHECK OUT — 357

GO OFF-LINE — 359

SHOES GALORE
TOP — 358

FIG. 3E

Thank you for your order!

Your loyalty points are over $300.00

Please choose one of the following gifts:

361  
○ Cross-Trainer-Lite  
CTL-33  
Men's size 10.5

362  
○ Jogger's Delite  
JD-55+  
Men's size 10.5

360

Submit to receive selected gift — 366

Decline gift — 367

[GO OFF-LINE] — 369

FIG. 3F

Thank you for your order!

SHOES GALORE  
TOP — 378

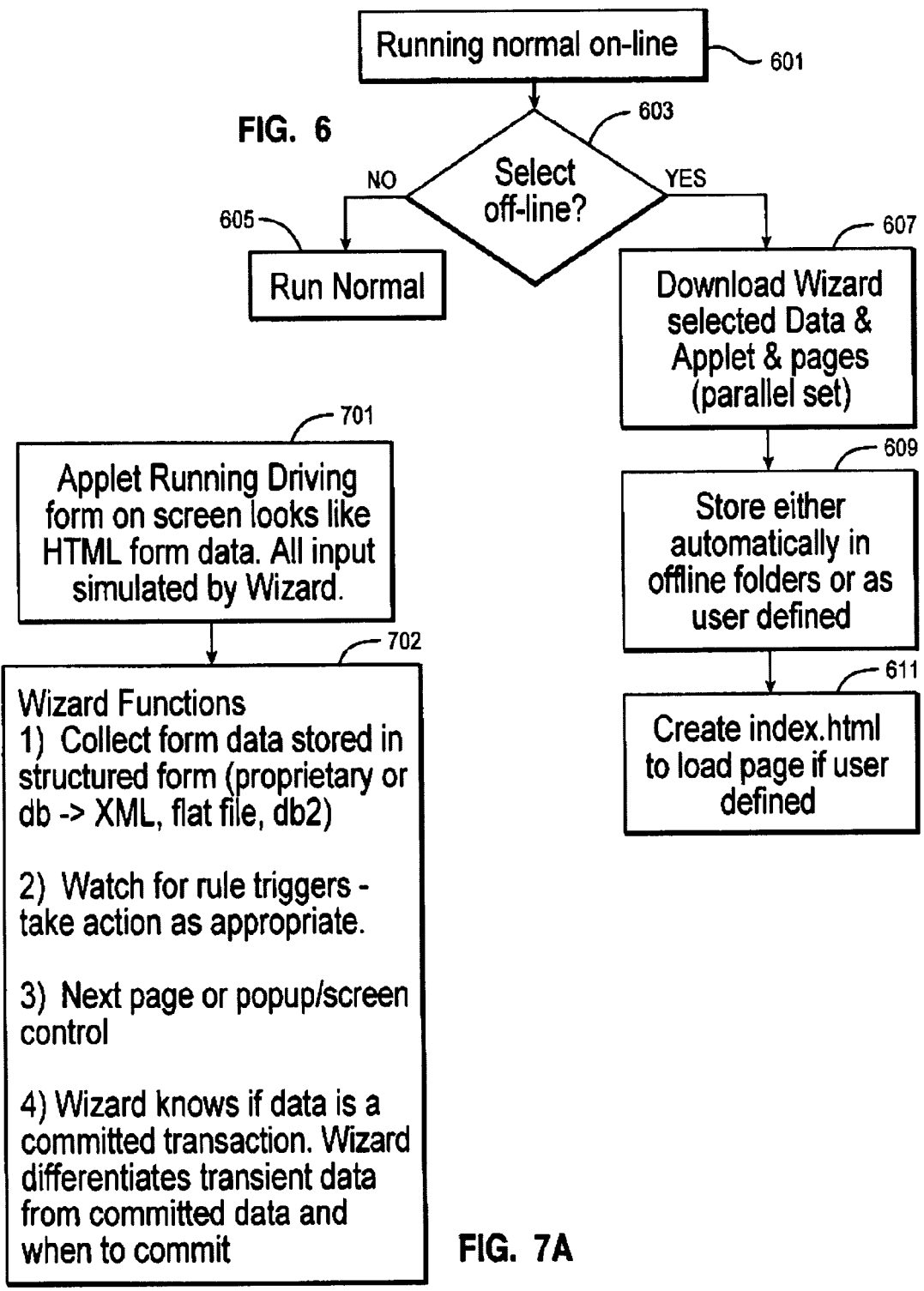

RUNNING DYNAMIC WEB PAGES OFF-LINE WITH A WIZARD

CROSS REFERENCE TO RELATED APPLICATIONS

U.S. Ser. No. 10/183,650 titled "CREATING AND UTILIZING A WIZARD TO CAPTURE AN APPLICATION'S INTERDEPENDENCIES BETWEEN WEB PAGES AND DATA ACCESSES FOR RUNNING THE APPLICATION'S DOWNLOADABLE DYNAMIC WEB PAGES OFF-LINE," commonly assigned, and filed even date herewith, is herein incorporated by reference.

BACKGROUND OF THE INVENTION

1. Field of the Invention

This invention relates to enabling linked documents to be downloaded from a server to a client over a network; and more specifically, to a system, method, and program for enabling dynamic Web pages to be downloaded and run off-line.

This invention relates to running applications off-line at a client; and more specifically, to running dynamic Web pages, downloaded from a server, off-line at a client.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory.

The computational networks may be connected in any type of network including the Internet, an intranet, a local area network (LAN) or a wide area network (WAN). The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

The term e-commerce is used herein to refer to any commercial activity using computers interconnected by a communication network, e.g., the Internet. Because of the unique characteristics of the Internet, carrying out commercial transactions over the Internet presents new issues and new opportunities.

As a result of the ubiquitous use of client and server communications over a network, many transactions are now conducted solely "on-line". A problem exists for a user at a client machine that may want to run an application off-line, i.e., disconnected from the network. For example, the user may want to fill out a travel expense account form without having to be connected to the on-line travel expense account application. It would be desirable for a user to be able to submit, at a later time, the user's off-line generated input to the on-line application when the user is later reconnected to the network.

Off-line generated forms can easily be generated off-line and later submitted on-line if the form is static, that is, if the form data does not change. However, if the required input is dynamic, that is dependent on a previous user input, or is dependent upon other dynamic data, such as current data from a remote database, the ability for a user to generate all of the user input completely off-line is currently not being provided for.

It is known to provide a user with off-line processing functions by utilizing a separate client application. However, if similar on-line processing functions were provided from a server application, the provider is burdened with creating and maintaining two separate applications, one to run in a client server environment as a Web page, and another to run off-line in a client. This need is magnified considering the increasingly large number of mobile clients needing such separate off-line applications. A mobile client may include personal digital assistants (PDAs), Palm Pilots, laptops, etc.

One type of on-line transaction involves the buying of books over the network from an electronic commerce merchant. An on-line transaction to purchase a book would require the user to access, over the network, a product database of currently available books and current prices. The server application that enables this on-line transaction also requires database access to access the user's profile. For example, based upon the user profile, the user may be presented with certain discounts or promotional offers not available to everyone else. Because of the dynamic nature of the server application, and the database accesses required, this type of application has not been able to be downloaded and run off-line. If a separate client application were to be created, it would be limited in the amount of selectable data available, such as the number of available books. In addition, the data, such as the pricing data, would be outdated in a very short time after the creation of the separate client application.

SUMMARY OF THE INVENTION

It is therefore an object of the invention to enable an electronic merchant to create and maintain only one transaction application without having to provide a separate client application.

It is a further object of the invention to enable a client to download an interactive Web page transactional application, e.g., dynamic Web pages, from a server and run the transactional application, with user-input, off-line.

The system, method, and program of the current invention enables a dynamic Web Site that includes at least one of i) at least one database access, and ii) a dynamic presentation order of Web pages, to be downloaded and run off-line. A preferred embodiment provides a four step process that enables a user to process an on-line transaction while running off-line. First, a wizard is utilized while the Web site carrying out the transaction is being created. The wizard learns the dynamic nature of the application as the application is being built. Next, the application, the wizard, and applicable data are downloaded. Third, while the transaction is being run off-line, the wizard provides the necessary interdependencies. Fourth, the completed Web pages are then uploaded to the merchant's Web site to complete the transaction when the client is running again on-line. More specifically, these four steps are carried out in the system, method, and program of the invention as further described.

A GUI wizard is provided in the integrated developer environment to assist in the creation of the Web site. The wizard GUI learns the interdependencies between the different pages of the Web site, i.e., as a user would progress through the on-line transaction; and the interdependencies with databases, user profiles, user cookies, etc. The wizard GUI helps the Web master create the Web site, and keeps track of the interdependencies of the relationships of the pages and the databases.

During runtime, if a user is able to run off-line at a given point in the application, a run off-line button is enabled. Otherwise, a user will not be able to run off-line at that given point in the application. When the user first accesses the application on-line, the user makes a selection indicating that the user desires to run the application off-line. The user may be queried as to the amount of data the user desires to download, or the data may have already been selected within the server application before selecting to go off-line. For example, the user may have selected all of the merchant's product database, such as books, to be downloaded, or the user may have selected only a subset of the products by category, such as books in the category of gardening, to be downloaded. The user's storage capability on the client machine may be taken into consideration on the amount of data to be downloaded. As such, to run the application off-line, the user would download the Web site, i.e., the application, the interdependencies, the database access, the user profile, and anything else that was needed to fill out the required information off-line. At least part of the wizard would also be downloaded to enable the application to be run off-line.

After downloading, the user can then run off-line at any time. While off-line, the wizard would automatically playback the downloaded Web pages in a sequence dependent upon the acquired interdependencies. As the user clicked through the downloaded Web pages, the wizard would fill in the product selection, e.g., if a user subcategorized the product database, and process the other interdependencies. The off-line processing would appear to the user as if the user were on-line. Once the user completed the transaction, for example, once the user purchased some number of books, the user would enter submit. The transaction is not submitted to the on-line merchant since the client is off-line. However, the next time that the client became connected on-line, and the browser was brought up, the wizard would submit the client data, i.e., the completed Web pages, to the on-line merchant.

BRIEF DESCRIPTION OF THE DRAWINGS

For a more complete understanding of the present invention and the advantages thereof, reference should be made to the following Detailed Description taken in connection with the accompanying drawings in which:

FIGS. 3A–3G is an illustrative example of a set of dynamic Web pages;

FIG. 6 illustrates the process flow and program logic for a user running a Web page transaction on-line that desires to run the Web page transaction off-line;

FIGS. 7A–7B illustrate the process flow and program logic being implemented when a customer runs off-line.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The present invention is carried out between at least two computers such as between a server and a client computing system. The client and server systems may be any one of a variety of systems, including a variety of computing systems and electronic devices under a number of different operating systems. In one embodiment of the present invention, the client computing system is a portable computing system such as a notebook computer, a palmtop computer, a personal digital assistant, a telephone or other electronic computing system that may also incorporate communications features that provide for telephony, enhanced telephony, messaging and information services. However, the client computing system, as well as the server system, may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
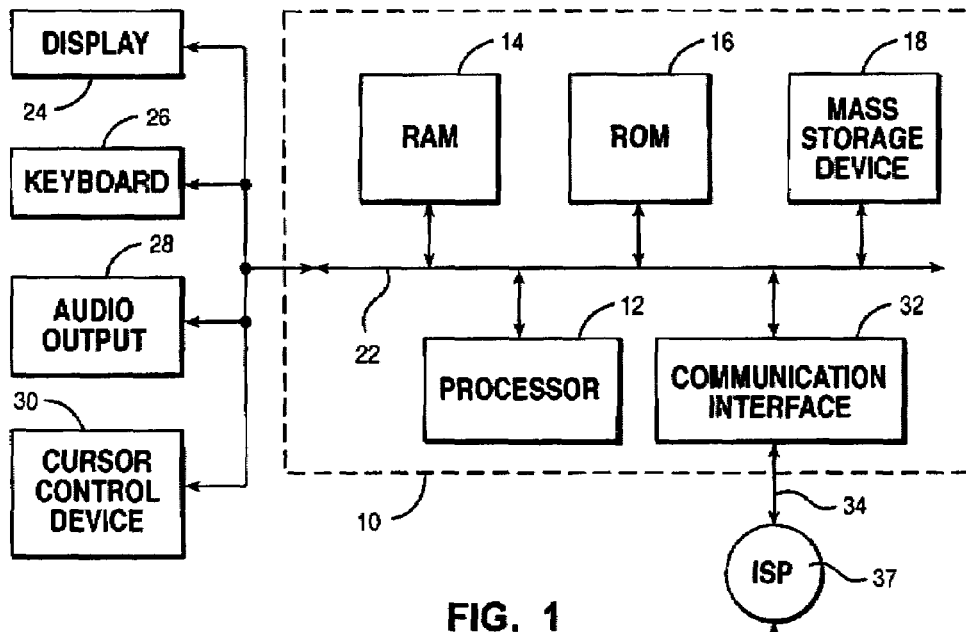
FIG. 1 depicts one embodiment of a computer system with which the method, system, and program of the present invention may be advantageously utilized.

Referring now to the drawings, and in particular to FIG. 1, there is depicted one embodiment of a computer system network, having at least a client 10 and a server 39, with which the method, system, and program of the present invention may be advantageously utilized. The following description of the structure of computer system 10 may be applicable to either a client or a server in the network. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. As a client, one application may include a messaging system client application (e.g., a browser) capable of transmitting and receiving messages containing commands to and from a messaging system server application within a server within a data processing system network. System 10 may execute one or more applications, either within browser application or apart from browser application. Such application(s) include the functionality describe below to run dynamic Web pages off-line utilizing a wizard application. As such, in a preferred embodiment, application software contains machine executable instructions that when executed on processor 12 carry out the operations depicted in the flowcharts described herein. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 is also attached to bus 22 for providing visual, tactile or other graphical representation formats. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-readable medium having stored thereon the machine executable instructions used to program computer system 10 to perform a process according to the present invention. The term "machine-readable-medium" as used herein includes any medium that participates in providing instructions to processor 12 or other components of computer system 10 for execution. Such a medium may take many forms including, but not limited to, nonvolatile media, volatile media, and transmission media. Common forms of nonvolatile media include, for example, a floppy disk, a flexible disk, a hard disk, magnetic tape or any other magnetic medium, a compact disc ROM (CD-ROM), a digital video disc-ROM (DVD-ROM) or any other optical medium, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide are network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communications interface 32, which carry the digital or analog data to and from computer system 10, are exemplary forms of carrier waves transporting the information.

A data processing network may include one or more servers which are accessible as part of the Internet or other network, and one or more clients which may access servers. Content may be accessed using any of a variety of messaging system protocols including Hypertext Transfer Protocol (HTTP), File Transfer Protocol (FTP), Network News Transfer Protocol (NNTP), Internet Mail Access Protocol (IMAP) or Post Office Protocol (POP), etc. In a preferred embodiment, servers contain Hypertext Markup Language (HTML) Web pages. Communications between data processing systems occur over the Internet and conform to the Hypertext Transfer Protocol (HTTP) in accordance with the known art.

Figure 2:
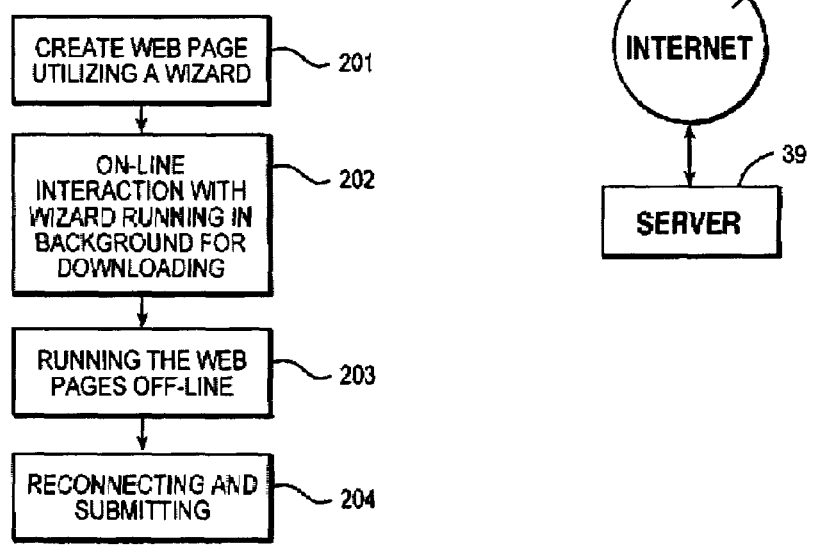
FIG. 2 is a flow chart illustrating the four-part process for creating and downloading a dynamic Web site, for running the downloaded dynamic Web site off-line, and for submitting the Web pages with user data when reconnected on-line.

FIG. 2 is a flow chart illustrating the four (4) part process for creating and downloading a dynamic Web site for running off-line by running a wizard in the background. The rules for the wizard were created and saved during the Web page development phase. The four part process includes i) creating a Web page using a wizard that keeps track of the background tasks that take place as result of an expected interaction with the Web page, 201; ii) an online user interaction with the Web page while the wizard runs in the background to keep track of what is needed for off-line execution for when the user selects to go off-line, 202; iii) running the Web page off-line, 203; and iv) reconnecting with the network and submitting the transactional Web pages, 204, that were interacted with while off-line.

More specifically, a Web page is created such as by using a Web page production tool, e.g., Websphere Studio Application Builder, Frontpage, etc. While the Web page is being created, a wizard is running in the background keeping track of the interdependencies of all of the Web pages involved. The tool generates a list of URLs and may utilize XML to describe the dependencies. This list is used later when the Web page is selected to run off-line. The wizard also keeps track of what database information is needed for each subsequent page. The wizard knows the dependencies, and is able to download all of the pages/data that might be needed in order for the user to interact with the Web pages off-line.

During the second phase, the wizard runs in the background and keeps track of what needs to be downloaded to a user's system if the user selects the "run off-line" button. Thus, the wizard keeps track of what part of a database needs to be downloaded, the user personal information, and the exact page interdependencies that are previously defined from the first phase.

During the third phase, the wizard runs the pages through a browser just as if the user were online. Instead of the transactional application being run by a server, the transactional application is run by the wizard with calls to XML and a database. In general, the user would not be able to tell the difference between running online versus off-line. If the user buys an item while off-line, it is kept in a special folder in a browser.

During the fourth phase, once the user reconnects online, the wizard executes the submission to the server as if the user had run the transaction.

Web Page and Wizard Creation

As a user runs a program to build a Web site, such as Home Page Builder or WebSphere Studio, the wizard keeps track of the page interdependencies, the database accesses that it would need, and data access to the consumer's personal information such as an address. There is an indication in the wizard to go and get the consumer personal information. The wizard would also be developed to keep track of what database limitations the user selected, while the user was online, to scope down the available products. As such, as the web page was being developed, such as to offer products for sale, the wizard would keep track of the page interdependencies and where the personal data would need to be used. A pointer would be kept to the off-line version. In a preferred embodiment, there is an XML list of the things that the wizard would need to have to run off-line including personal information, databases, page and subsequent pages from the point where the user selected to run off-line. Keeping track of the interdependencies involves keeping track of a list of the URLs and subURLs.

The wizard would know whether the user is running off-line or online. If running off-line, the wizard would know to go to the XML data to fill in the blanks for the information. For the database queries, depending upon the application, there are several different embodiments for keeping the database while running off-line. In one embodiment, the result from any database queries are downloaded into an XML type of format. In another embodiment, the database is downloaded into a database on the hard drive of the client.

As the Web page is being developed by dragging and dropping buttons, panels, and filling in forms, the wizard keeps track of what pointers need to be automatically pre-filled when running off-line, as well as the page interdependencies and what database access need to be hit to fill in the necessary information or for database queries for that section.

When a user is running online and accessing Web pages from a Web site comprising an online transactional application, when the user selects a "run off-line" button, at that point, the wizard gets all personal information and puts the personal information into a database or an XML format. The "run off-line" selectable button may be on the browser or embedded in each Web page at points where the designer of the Web page allows the user to go off-line. At the point where the user selects to run off-line, the wizard determines the size of the database that the wizard needs to go to. The wizard would then keep track to know to download the certain size database if a selection to run off-line is made at that point in the program. The wizard keeps track of what a user would need to run the application off-line from the point in the application where the user selects to run off-line. Typically what is needed is the portion of the database of products that the user has narrowed the user's selection down to, the "add to cart" button, and any checkout pages. The checkout pages may access the customer personal information to find the customer's name to display on a "Thank You" "Customer" page, and for filling in the credit card number and any name and address for shipping.

The invention and preferred embodiment will be further described with reference to FIGS. 3A–3G which together make an illustrative example of a set of dynamic Web pages. The illustrative set of Web pages create a transactional application for buying shoes over the Internet. In this example, the home page of Shoes Galore has a URL of shoesgalore.com. The home page 310, FIG. 3A, states that the types of shoes offered are men's, women's and children's shoes in either a sport, casual, or dress style. There is a "go off-line" button 319 which would tell the wizard to go off-line at this point in the program. The wizard would have to download the entire Shoes Galore shoe database if the user selected to go off-line at this point in the program. In some embodiments, a user would not be enabled to go off-line until after the user makes a selection and narrows the goods from the database. A user selection of either the "next" button 312, or the "search for your shoe size and shoe type" button 311 will take the user to a next page, 320. A next Web page, 320, FIG. 3B, enables the user to select the size 321 and type 322, 323 of shoe. The URL being used as an example for this Web page is shoesgalore.com/select-search. The Web page shows a selection having been made by a user for a men's sport shoe in size 10.5. The user is enabled to go off-line at this point by selecting button 329, or submit the search via button 327, or return to the home page via selectable area 328. If the user chooses to go off-line at this point in the transactional Web page application, only the data matching the search criteria would be downloaded from the database.

Figure 3A:
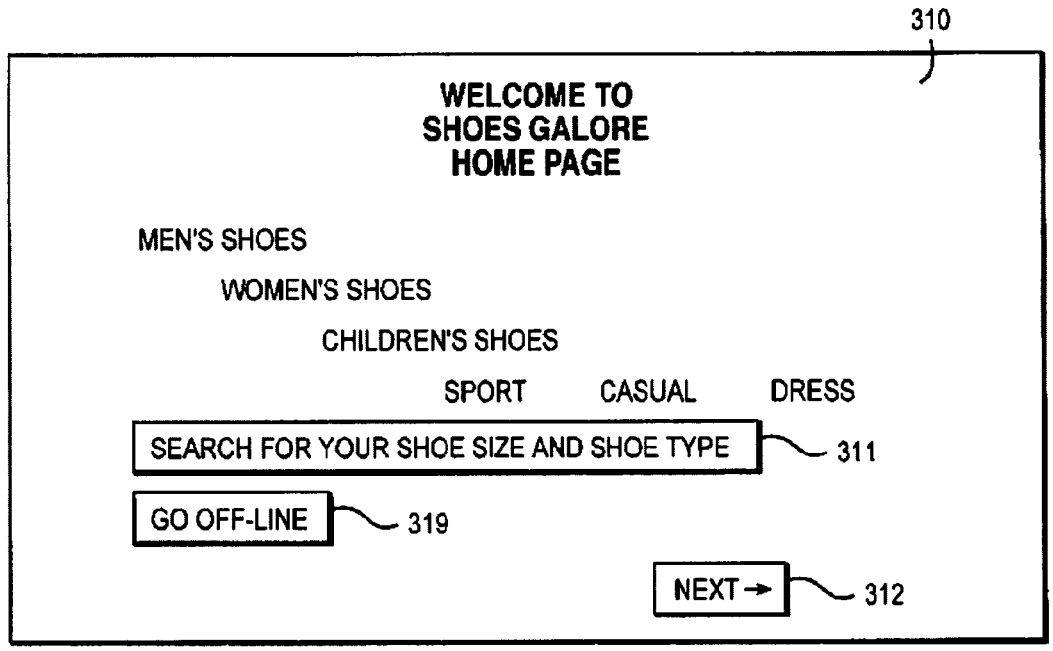
Figure 3B:
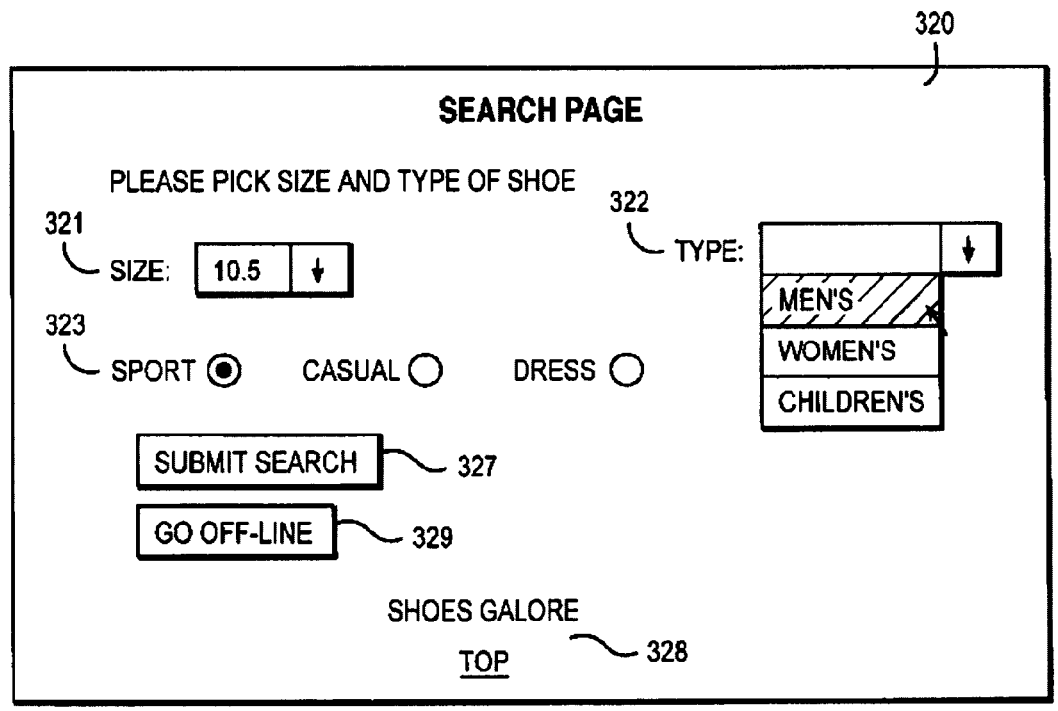
Figure 3C:
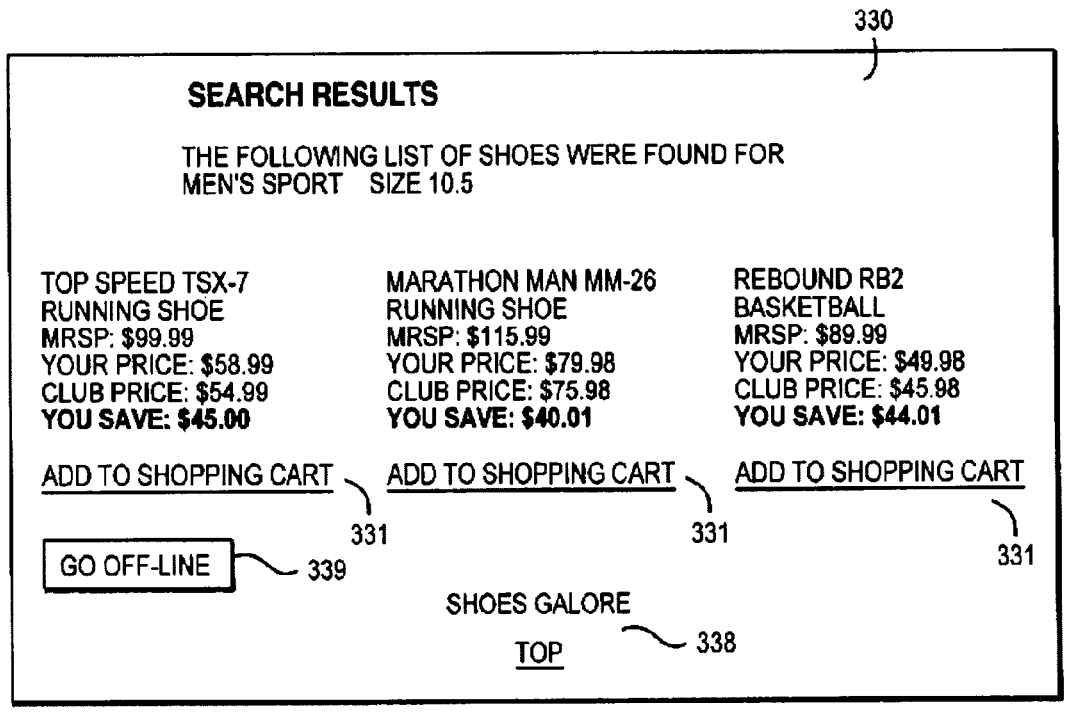

A next Web page, 330, FIG. 3C, displays the search results from the search criteria previously submitted. The user can add any of the selections to the shopping cart via buttons 331, go off-line via button 339, or return to the home page via selectable area 338.

Figure 3D:
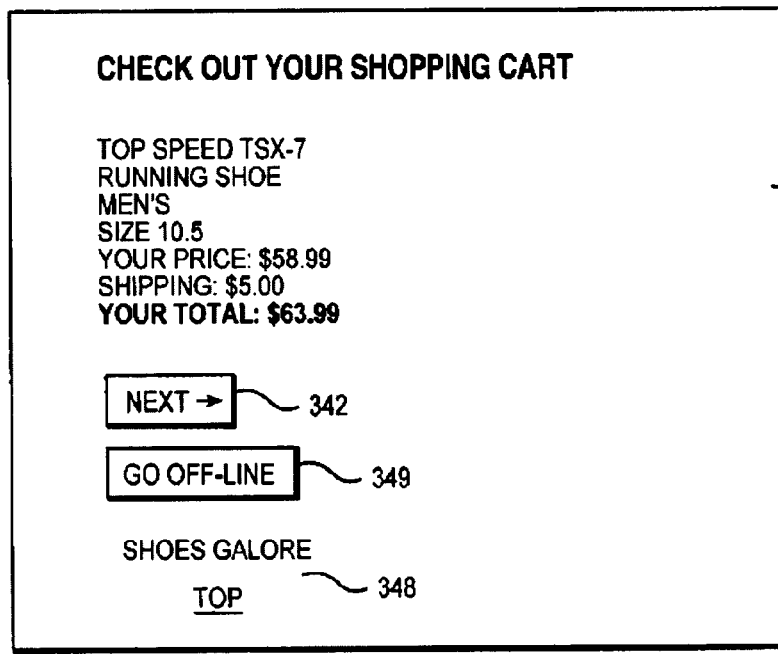

If a "add to shopping cart" 331 selection was made, a "check out your shopping cart" page 340, FIG. 3D, would follow showing the current selections made. At this point, the user can go to a next page by selecting the "next" button 342, go off-line by selecting the "go off-line" button 349, or return to the home page by selecting selectable area 348. The next page 350, FIG. 3E, takes payment and shipping information from the user. Either during on-line processing, or off-line processing by the wizard, user data such as from a cookie stored at the client by the Shoes Galore Web site, would be automatically accessed and used to populate the input form. The users personal information would always be downloaded, or available to the wizard when running at the client. In other embodiments, the information is filled in by the user. The user can either go off-line at this point by selecting button 359, or checkout and commit the transaction by selecting the checkout button 357, or return to the home page through selectable area 358.

If the transaction is committed by selecting "checkout" button 357, a running total of amounts spent by the user is determined by adding the current total, 356, to a cumulative total from any previous transactions by this user. If the running total surpasses a predetermined amount, Web page 360, FIG. 3F, will be displayed to the user. This is a dynamic Web page since whether or not it is displayed to a user is dependent upon current user input in a previous page. As shown in this example, this Web site offers a gift to be selected if the running total is over $300.00. The user is enabled to select one of the gifts, 361, 362, select "submit" 366 to receive the selected gift, decline a gift at this time by selecting "decline" 367, or select to go "off-line," 369.

The final "Thank You" page 370, FIG. 3G enables a user to return to the home page via selectable area 378.

Figure 4:
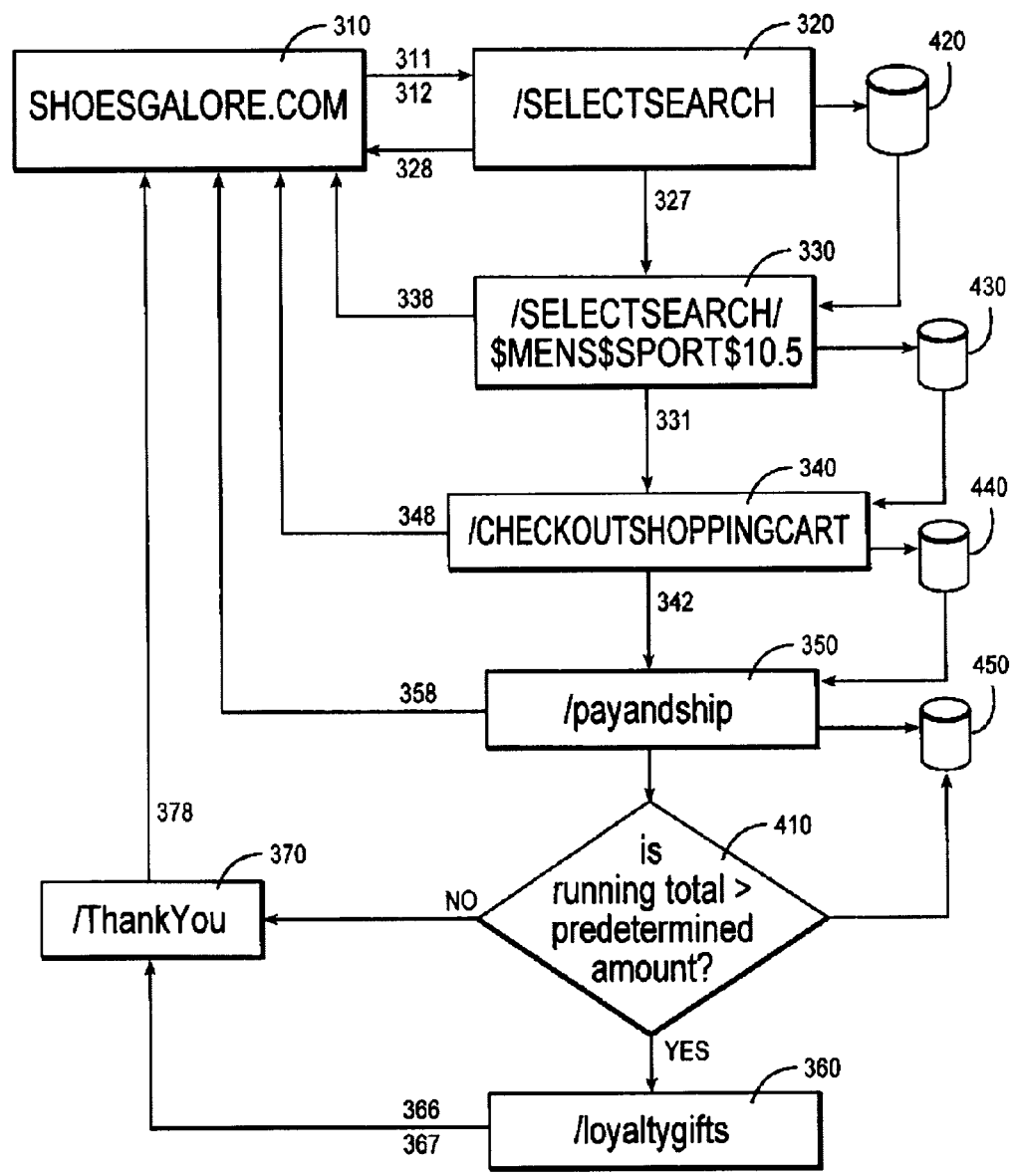
FIG. 4 illustrates the interdependencies between the Web pages and data accesses.

These Web pages have the following URLs for this illustrative example:
home page 310, FIG. 3A—shoesgalore.com
search page 320, FIG. 3B—shoesgalore.com/selectsearch
results page 330, FIG. 3C—shoesgalore.com/selectsearch/$mens$sport$10.5
checkout shopping cart page, 340, FIG. 3D—shoesgalore.com/checkoutshoppingcart
payment and shipping page, 350, FIG. 3E,—shoesgalore.com/payandship
loyalty gift page, 360, FIG. 3F—shoesgalore.com/loyaltygifts
Thank You page, 370, FIG. 3G—shoesgalore.com/thankyou FIG. 4 shows the interrelationship among these pages. The home page, shoesgalore.com 310, can be returned to via any of the pages 320, 330, 340, 350, 370 via selectable areas 328, 338, 348, 358, 378, respectively. From the home page, shoesgalore.com, 310, a next page 320 is reached via buttons 311 or 312, then page 330 via button 327, then page 340 via button 331, then page 350 via button 342. Depending upon previous user input, a determination is made whether a running total amount is greater than a predetermined amount, 410. If the amount is greater, the next page is page 360 and then page 370 via selection 366 or selection 367. If the amount is not greater, the next page is the last "thank you" page 370.

As such, as the Web pages, FIGS. 3A–3G, are being created, a wizard running in the background keeps track of the interdependencies between the pages as shown in FIG. 4 and any intervening calculations as shown at block 410. In addition, the wizard keeps track of any database accesses that are needed, or other access to data, to generate the data to be presented to a user in subsequent Web pages or that are needed to perform the intervening calculations.

As shown in FIG. 4, the wizard keeps track that i) the shoe inventory database 420 would need to be accessed from Web page 320; ii) any search results from page 320 are needed for page 330; iii) a user selection of an item to be added to the shopping cart of Web page 330 is to be stored in shopping cart storage 430 and used in the "Check Out Your Shopping Cart" Web page 340; iv) after leaving Web page 340, user data 440 must be accessed to get the user information such as credit card number, name, billing address and shipping address; v) the total 356 from Web page 350, FIG. 3E, is to be stored in user database 450 and added to a user's accumulative total.

Figure 5A:
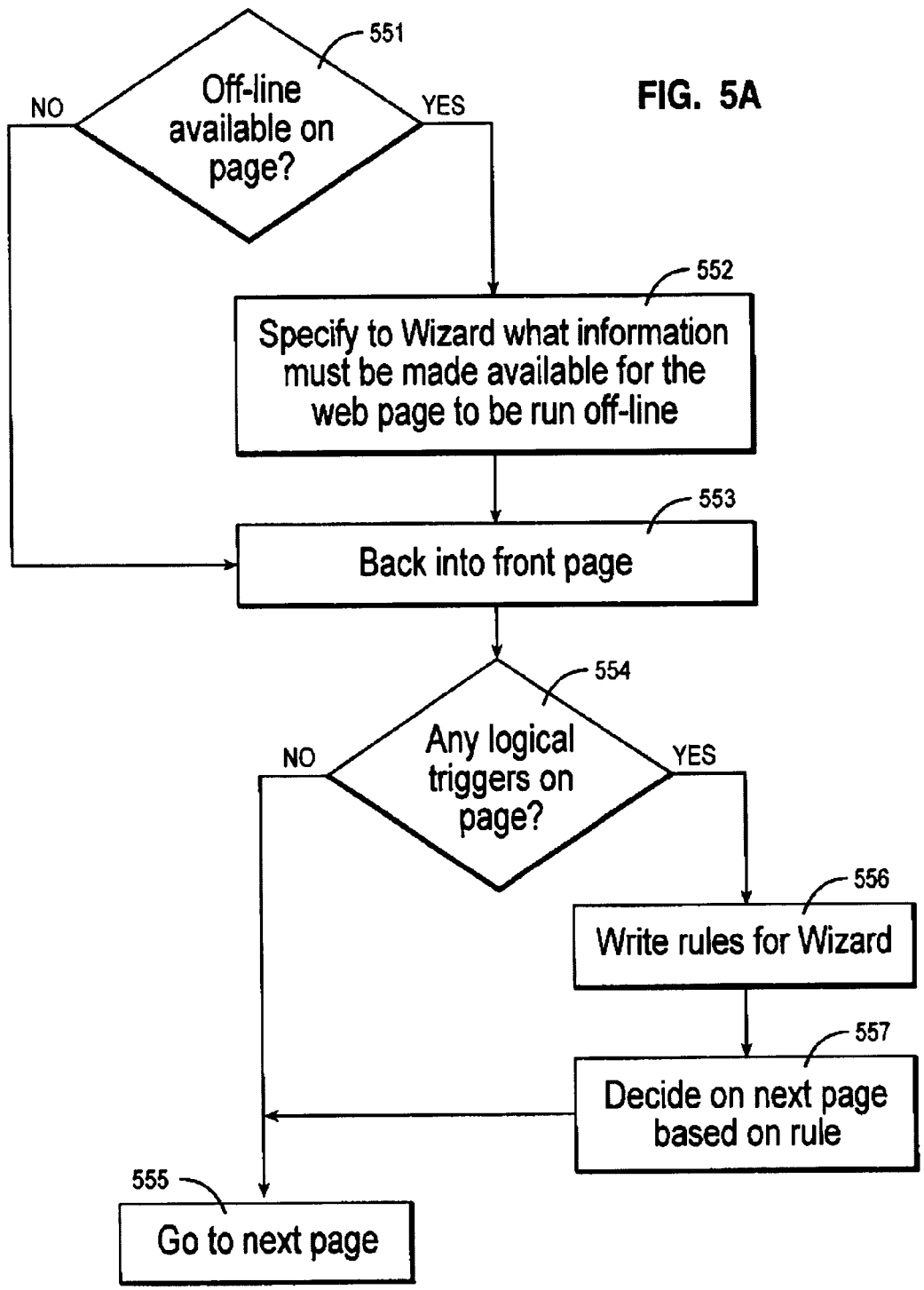
FIGS. 5A and 5B illustrates the process steps and program flow of developing a wizard that learns the interdependencies of the Web pages as they are being built.
Figure 5B:
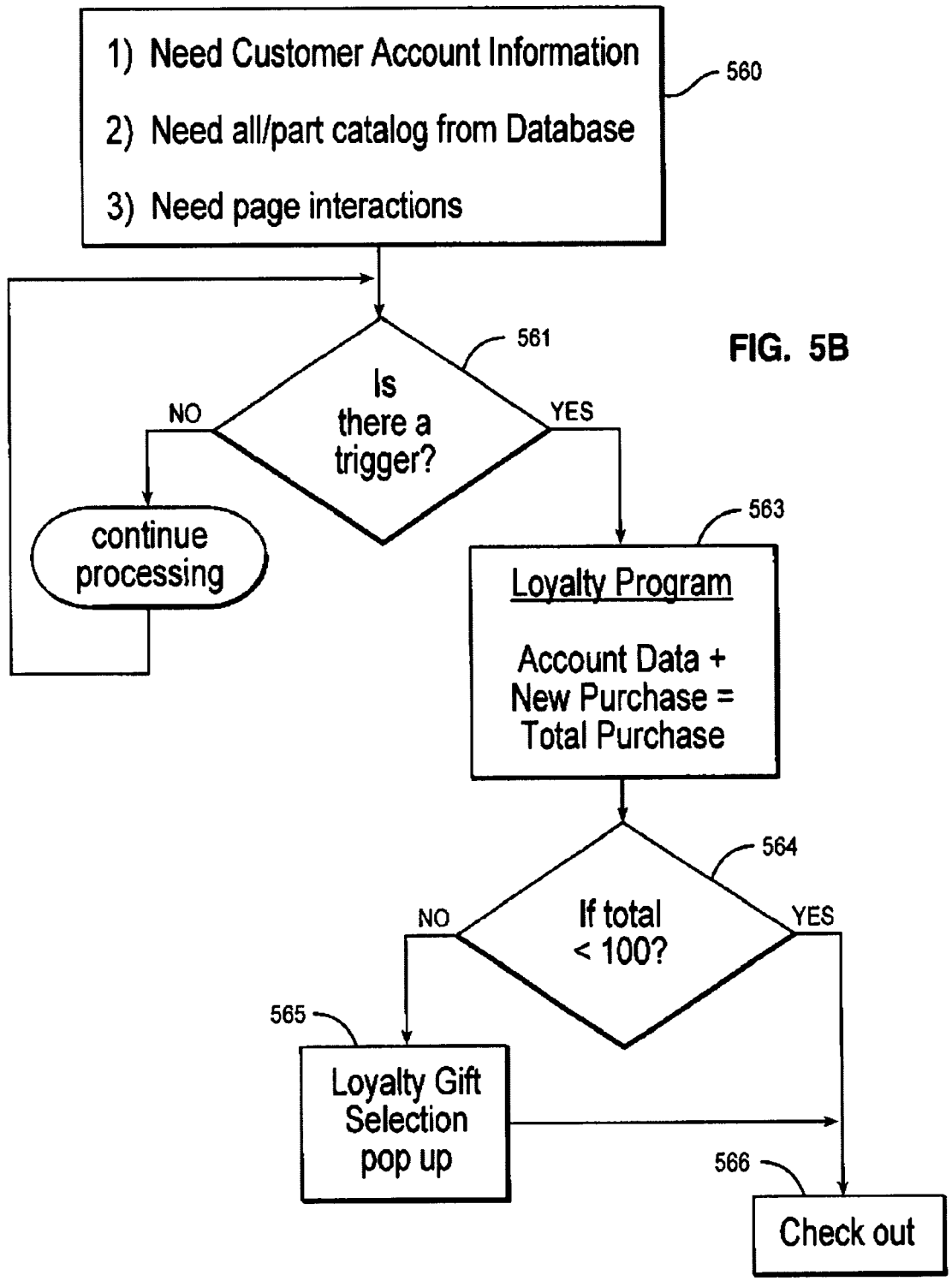

FIGS. 5A and 5B illustrate the process steps and program flow of building Web pages with a wizard that learns the interdependencies of the Web pages as they are being built. In an alternative embodiment, the wizard is run after the Web page is created; i.e., the wizard learns the interdependencies as the Web pages are being run. FIG. 5A illustrates the development of a wizard when developing transactional Web pages so that the wizard can execute certain functions to enable Web pages to be processed off-line in a same or similar way as if they were being processed on-line.

First it is determined whether or not a given Web page will be made available off line, 551. If it is not available, then the wizard backs into a front page, 553. If a given Web page will be made available to a user off-line, then the Web site creator will specify to the wizard what information will need to be available for that Web page to be run off-line, 552. The wizard is also told how the information will be stored. It is up to the developer of the Web page to determine how the information is to be stored. For example, for proprietary information, the information may be encoded. If a large scale database needs to be downloaded, an application may need to be downloaded that initializes the database with data. If smaller databases are desired for the off-line version, for example, no long descriptions will be used, but only short descriptions would be used when running off-line. An expiration date of the database application may be included which would inform the user to go back on-line to download more current information before running off-line. For example, if the transaction program were to be downloaded in February, but the wizard determines the current date of running off-line is June, the wizard may inform the user to go back on-line so that more current information could be downloaded. In a preferred embodiment, the wizard hooks into the browser to notify the browser when the user is running off-line. In this way, if the user goes to a URL while running off-line, the wizard will bring up the off-line version of the Web site and not the on-line cached version of the Web site.

Next, the wizard is then informed of any triggers on the page, 554. If there are no triggers, the wizard is informed to go to the next page, 555. If there is a trigger, the Web page creator writes the rules for the wizard to follow, 556. A next page is determined based on the rules, 557. The wizard process of FIG. 5A is utilized when developing Web pages for a Web site such as one involving a purchase transaction for an item from a catalog of items as previously described.

FIG. 5B further illustrates a process flow for the scenario when a trigger is being utilized as previously discussed with respect to FIG. 5A. More specifically, in this scenario, the trigger exists because the Web site offers a free or discounted gift to loyal customers that have purchased a certain amount from an accumulation of all previous transactions.

As such, in order for a user to run the Web pages off-line, the wizard is either informed by the Web page creator, or the wizard figures out as the Web pages are being created, as discussed below, that certain information is needed, e.g., current account information, all or part of the catalog, and any page interactions, 560. Next, the wizard is informed of any triggers being implemented, 561. For example, there may be a trigger that is implemented for a purchase loyalty program. That is, when the transaction detects that the user has purchased goods amounting to a certain value, the program may automatically implement a discount or other special offer. For this scenario, a trigger may be implemented for the Web page that is being made to receive current purchase information. The wizard would then know that the current account information for the user, e.g., a running total of amounts previously purchased, as indicated at block 560, would need to be downloaded before the user ran off-line. In response to the trigger, the Web page creator would have written the following rules for the wizard a) access the downloaded account information for the running total of purchases; b) add to that running total the current purchase amount from the current Web page for a new running total purchase amount, 563; and c) determine if the new running total is equal to or greater than a specified amount, 564. If it is not, the wizard causes the regular check out Web page to be presented to the user, 566. If the new running total is equal to or greater than the specified amount, then the wizard causes a different Web page, such as a loyalty gift selection page, to pop up to the user, 565.

In general, in one embodiment, an XML list is generated of the things that the wizard would have to have in order to run off-line. The XML list would include the user's personal information, databases, the page where a user selects to run off-line, the pages after that page that are needed to run off-line, the interdependencies of the Web pages, the triggers, and the rules for each trigger. The number of pages needed to run off line may be as few as one or as many as ten or so. The interdependencies are the order in which the Web pages need to be presented to the user based upon user data inputted or generated in a current Web page.

Downloading to Run Off-Line

FIG. 6 illustrates the process flow and program logic for a user running a Web page transaction on-line that desires to run the Web page transaction off-line. If a user is running on-line, as normal, at a Web site, 601, a page on the Web site would provide a selectable item that a user could select to indicate that the user desires to continue off-line with the transaction, such as button 319, 329, 339, 349, 359, 369, FIGS. 3A–3F. If the selectable item, 603, is not selected, the user continues to run on-line as normal, 605, If the selectable item is selected, then the wizard selected data, applets and pages are downloaded, 607. In a preferred embodiment, a parallel or corresponding set of pages are downloaded since the pages presented to the user off-line may not be identical to the pages available to the user on-line. In a preferred embodiment, the downloaded data, applet, and pages will be stored automatically in an off-line folder, 609. In other embodiments, the downloaded data, applet, and pages may be stored in a user defined save to file. An index to HTML is created to load the page that was selected and subsequent pages downward, 611. As such, all of the preparation data (the wizard, databases, data, applets, and Web pages) is downloaded. There is a hook into the browser to load index.html if that URL is loaded during off-line mode.

Running Off-Line

FIG. 7A illustrates the process flow and program logic being implemented when a customer runs off-line. The wizard, i.e., applet, is running and driving the form on the screen which appears as HTML form data, 701. All input is simulated by the wizard. The functions of the wizard include collecting form data stored in a structured form. Such structured forms may include proprietary databases, XML, flat files, DB2, or any other form that the Web page creator defined it for the wizard as the Web page was being developed. The wizard also watches for, and identifies when there is a rule trigger. The wizard takes the appropriate action when there is a trigger. The wizard enables the next page or a popup to be displayed. The wizard has total screen control. The wizard knows if the data is a committed transaction. The wizard distinguishes between transient data and committed data and when to commit, 702.

Figure 7B:
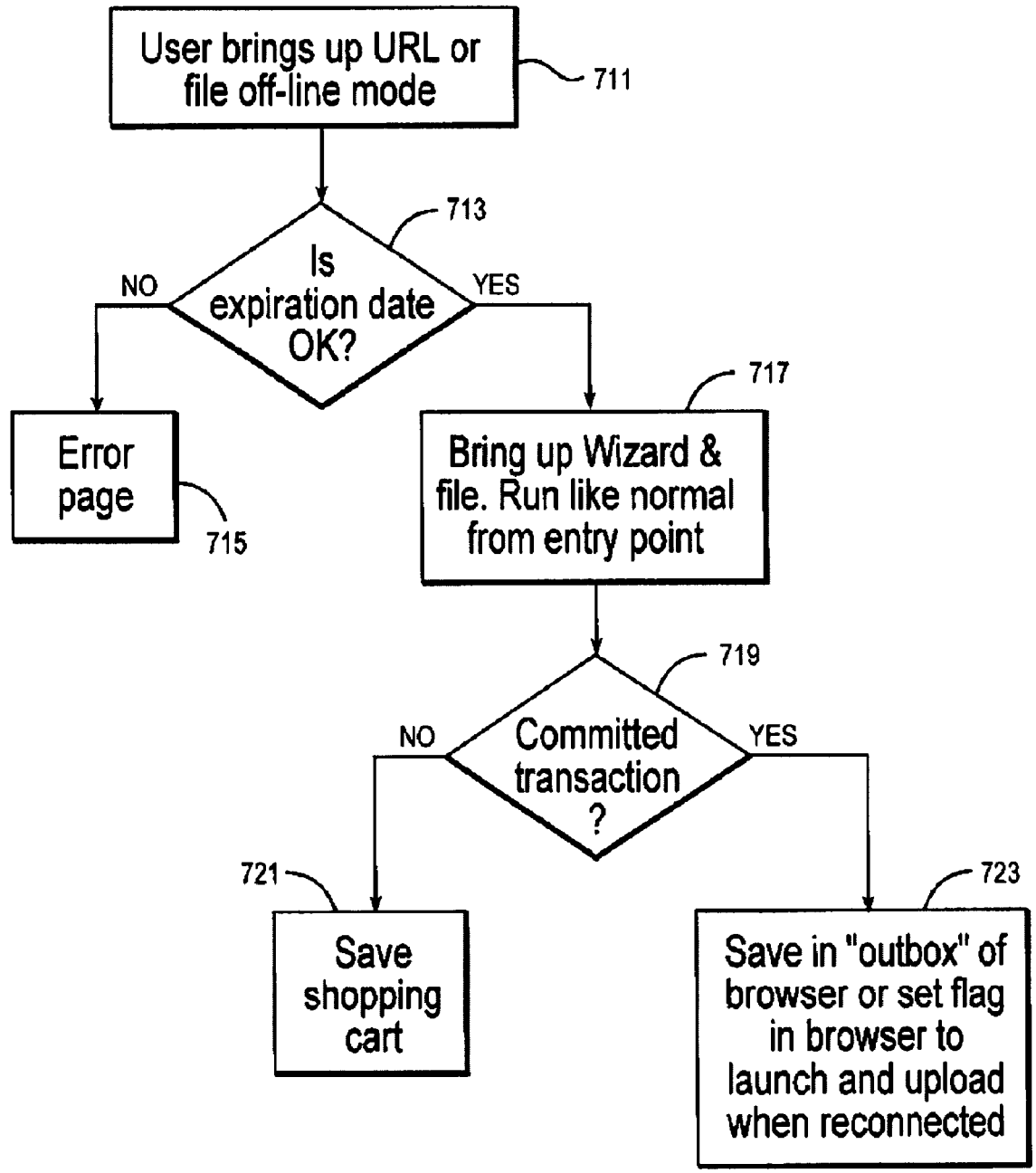

More specifically, as shown in FIG. 7B, the user brings up a URL or file in off-line mode, 711. The wizard determines from the user's computer clock and the date stored in the wizard during the download whether the expiration date for the downloaded data is acceptable, i.e., whether the expiration date has not passed, 713. If the date has passed, the wizard displays an error message indicating that the user must go back online to download more current data, 715. If the expiration date has not passed, then the process continues to step 717. The wizard runs the downloaded server program off-line as if the program were running online. The wizard runs the program as normal from the entry point as selected by the user for running off-line, or as specified by the wizard and web site designer. That is, it is possible that the user will not see the first page or so of the program that the user would have seen if running online. This may avoid some complexity of the wizard design and eliminate some of the required functionality of the wizard. It may also reduce the amount of data that would have otherwise needed to have been downloaded. For example, a given program that is enabled to be downloaded and run off-line in conjunction with the wizard may request the user to select a category of books that are of interest in a first page or so of the program running online. If a user is required to run online until the category of books is selected, then only the data for that category of books needs to be downloaded, instead of all books in all categories. The wizard then determines if input from the user is a committed transaction, 719. If the current input or transaction is not a committed transaction 721, then the wizard saves the shopping cart or other data as decided by the developer of the wizard and the Web site. If the transaction is a committed transaction, then the wizard saves in the outbox of the browser, or sets a flag in the browser to launch and upload the Web pages with the user's input when reconnected, 723.

Uploading when Reconnected Online

Figure 8:
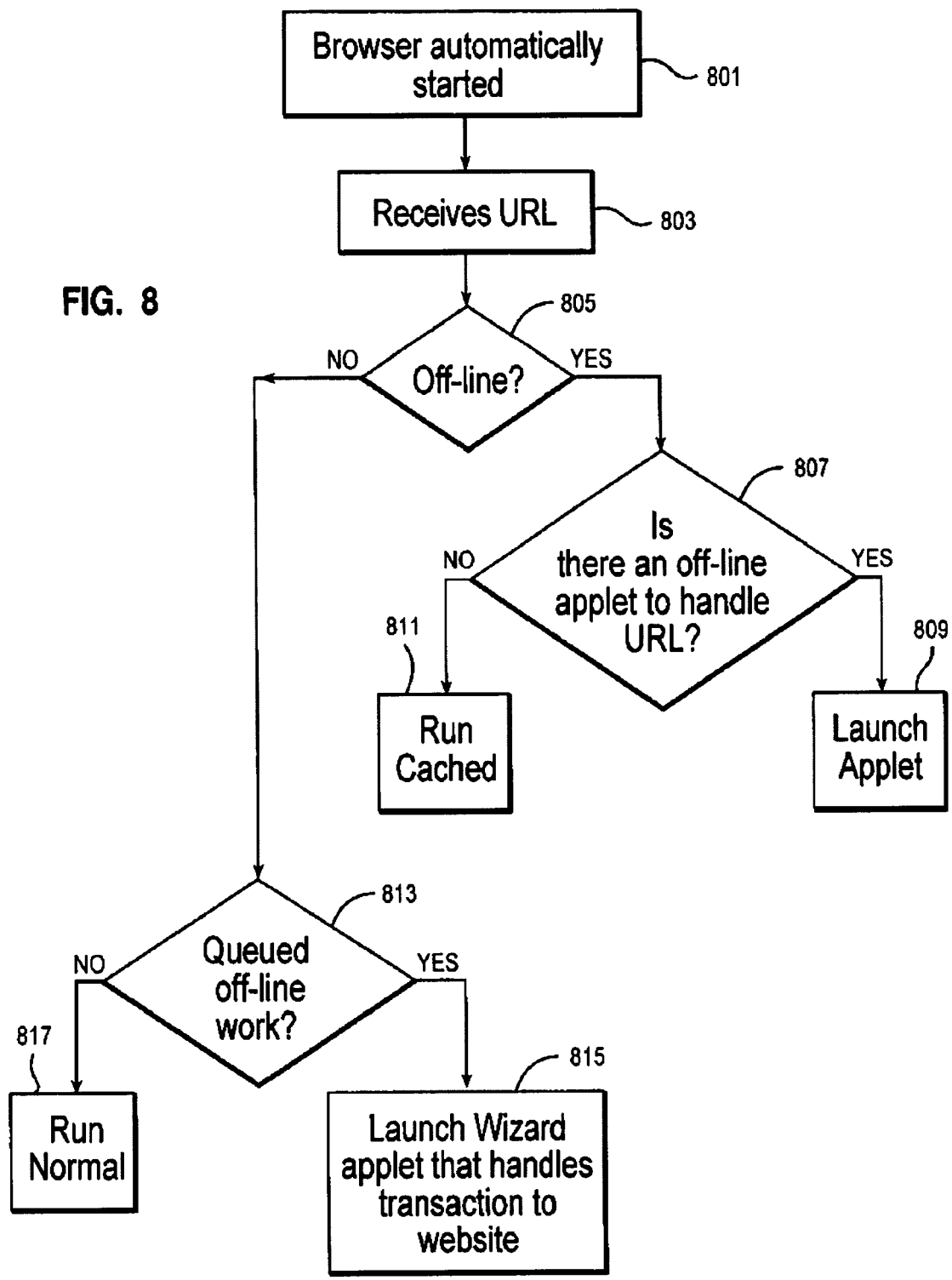
FIG. 8 illustrates the process flow and program logic when the user is reconnected on-line.

FIG. 8 illustrates the process flow and program logic when the user is reconnected on-line. In a preferred embodiment, the browser starts automatically when reconnected online, 801. The browser receives the URL from the user, 803. The browser determines if the browser is off-line, 805. If it has gone off-line, then the browser determines if there is an off-line applet (i.e., the wizard) to handle the URL, 807. If there is, the applet is launched, 809, and the process continues as illustrated in FIGS. 7A–7B. If there is not an off-line applet, then the browser runs the cached URL, 811. If the browser determines that the browser is running online, then the browser determines if there is any off-line work that has been queued, 813. If yes, then the wizard applet that handles the transaction to the Web site is launched, 815. If there is no queued off-line work, then the URL is run as normal online, 817. The launched wizard can run behind the scenes and automatically commit the transaction, or it can run in a simulated browser environment.

While running off-line, the wizard saves all of the Web pages with the user selections and inputs in an outgoing box in the browser. When the client reconnects to the network through the Browser, the wizard goes through and submits all of the pages as if the browser were on line. The Web site does not know the difference between the user running online and the user having previously inputted the information while running off-line. That is, the Web site is not aware that the client is not connected in real time, at that time, to the Web site.

The foregoing description of the preferred embodiments of the invention has been presented for the purposes of illustration and description. It is not intended to be exhaustive or to limit the invention to the precise form disclosed. Many modifications and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A method for enabling a transactional application running at a server system to be downloaded over a network and run off-line at a client system, comprising:
   running a wizard, in conjunction with running the application, that has database accesses required by the application and interdependencies amongst dynamic displayable pages of the application;
   downloading, to the client system, the wizard, pages of the application, and applicable data from at least one of the required database accesses when an indication to download is indicated; and
   running the downloaded wizard off-line to enable the transactional pages of the application to be completed by i) providing the applicable data; ii) playing back the pages of the application in a sequence dependent upon the tracked interdependencies and in response to user input received while running off-line; and iii) receiving user input.

2. The method of claim 1 further comprising automatically submitting the completed pages of the application to the server when the client is reconnected to the network.

3. The method of claim 1 wherein the applicable data from at least one of the required database accesses to be downloaded is dependent upon a point in the on-line running of the application in which the indication to download is received responsive to a user selection of a selectable item to run the application off-line, wherein the selectable item is enabled for display within at least one of the pages of the application at given points where the wizard is able to enable the application to run at the client system off-line.

4. The method of claim 1 wherein the pages of the application downloaded is dependent upon a location within the on-line running of the application in which the indication to download is received responsive to a user selection of a selectable item to run the application off-line, wherein the selectable item is enabled for display within at least one of the pages of the application at given points where the wizard is able to enable the application to run at the client system off-fine.

5. The method of claim 1 wherein the pages of the application are played backed in a sequence dependent upon rules followed by the wizard for a trigger during completion of a commercial transaction.

6. The method of claim 5 wherein the trigger specifies a different sequence of displayable pages dependent upon current user input received off-line.

7. The method of claim 1 wherein the downloaded server application is run off-line by the wizard in a simulated fashion representative of a running of the application on-line.

8. A method for enabling a transactional application running at a server system to be downloaded over a network and run off-line at a client system, comprising:
   running a wizard, in conjunction with running the application at the server, wherein the wizard tracks data accesses required by the application and interdependencies amongst dynamic displayable pages of the application; for completion of a commercial transaction through the transactional application; and
   upon receipt of user input indicating a preference to run the application off-line to complete at least a portion of the commercial transaction,
   i) accessing required data, and
   ii) downloading a current page and subsequent pages of the application, the wizard, and the accessed required data to a client machine indicating the preference to run off-line.

9. The method of claim 8 wherein the downloaded pages, wizard, and accessed required data are stored at the client.

10. The method of claim 8 further comprising:
    running the application at the client, disconnected from the server, by running the wizard to control the dynamic presentation of the downloaded pages and to provide the accessed required data to enable the transactional pages of the application to be completed.

11. The method of claim 10 further comprising saving the completed transactional pages in an outbox of a browser running at the client.

12. The method of claim 10 further comprising setting a flag in a browser running at the client to launch and upload the completed transactional pages with user input when the client is reconnected to the network.

13. The method of claim 10 further comprising:
    determining a first time value when the accessed required data is downloaded;
    determining a second time value when the wizard is run at the client;
    comparing the difference between the second time and the first time; and
    displaying an indication to reconnect on-line to get more current data if the difference is greater than a predetermined amount.

14. The method of claim 10 further comprising automatically submitting the completed pages of the application to the server when the client is reconnected to the network.

15. The method of claim 8 wherein receipt of user input indicating a preference to run the application off-line, is received through a selectable item displayed in conjunction with a display of the Web pages of the application.

16. The method of claim 15 wherein the selectable item is displayed as part of a browser user interface.

17. The method of claim 15 wherein the selectable item is displayed within at least one of the Web pages of the application at points where the wizard is able to enable the application to run at the client system off-line.

18. A computer program on a computer usable medium having computer readable program code means for enabling a server transactional application to be run off-line at a client system, comprising:
    means for tracking database accesses required by the application and interdependencies amongst dynamic displayable pages of the application;
    means for causing pages of the application and applicable data from at least one of the required database accesses to be stored at the client system when an indication to download is indicated; and means for enabling the transactional pages of the application to be completed by i) providing the applicable data; ii) playing back the pages of the application in a sequence dependent upon the tracked interdependencies and in response to user input received while running off-line; and iii) receiving user input.

19. The computer program of claim 18 further comprising means for automatically submitting the completed pages of the application to the server when the client is reconnected to the network.

20. A computer program on a computer usable medium having computer readable program code means for enabling a transactional application running at a server system to be downloaded over a network and run off-line at a client system, comprising:
 means for tracking data accesses required by the application and interdependencies amongst dynamic displayable pages of the application for completion of a commercial transaction through the transactional application; and
 means for receiving user input indicating a preference to run the application off-line to complete at least a portion of the commercial transaction, further comprising
 i) means for accessing required data, and
 ii) means for downloading a current page and subsequent pages of the application, the wizard, and the accessed required data to a client machine indicating the preference to run off-line.

21. The computer program of claim 20 further comprising:
 means for controlling the dynamic presentation of the downloaded pages; and
 means for providing the accessed required data to enable the transactional pages of the application to be completed.

22. The computer program of claim 21 further comprising means for saving the completed transactional pages in an outbox of a browser running at the client.

23. A computer system, comprising:
 means for running a wizard, in conjunction with running a transactional application while connected over a network to a server computer system, wherein the wizard tracks database accesses required by the application and interdependencies amongst dynamic displayable pages of the application;
 means for downloading the wizard, pages of the application, and applicable data from at least one of the required database accesses when an indication to download is indicated; and
 means for running the downloaded wizard off-line to enable the transactional pages of the application to be completed by i) providing the applicable data; ii) playing back the pages of the application in a sequence dependent upon the tracked interdependencies and in response to user input received while running off-line; and iii) receiving user input.

24. The computer system of claim 23 further comprising means for automatically submitting the completed pages of the application to the server when reconnected to the network.

25. The computer system of claim 23 wherein the applicable data from at least one of the required database accesses to be downloaded is dependent upon a point in the on-line running of the application in which the indication to download is received responsive to a user selection of a selectable item to run the application off-line, wherein the selectable item is enabled for display within at least one of the pages of the application at given points where the wizard is able to enable the application to run at the client system off-line.

26. The computer system of claim 23 wherein the pages of the application downloaded is dependent upon a location within the on-line running of the application in which the indication to download is received responsive to a user selection of a selectable item to run the application off-line, wherein the selectable item is enabled for display within at least one of the pages of the application at given points where the wizard is able to enable the application to run at the client system off-line.

27. The computer system of claim 23 wherein the pages of the application are played backed in a sequence dependent upon rules followed by the wizard for a trigger during completion of a commercial transaction.

28. The computer system of claim 23 wherein the trigger specifies a different sequence of displayable pages dependent upon current user input received off-line.

29. A computer system, comprising:
 means for running a wizard, in conjunction with running a transactional server application while connected to a server computer system over a network, wherein the wizard tracks data accesses required by the application and interdependencies amongst dynamic displayable pages of the application for completion of a commercial transaction through the transactional application; and
 upon receipt of user input indicating a preference to run the application off-line to complete at least a portion of the commercial transaction,
 i) means for accessing required data, and
 ii) means for downloading a current page and subsequent pages of the application, the wizard, and the accessed required data.

30. The computer system of claim 29 further comprising:
 means for running the wizard off-line to control the dynamic presentation of the downloaded pages and to provide the accessed required data to enable the transactional pages of the application to be completed.

31. The computer system of claim 30 further comprising means for saving the completed transactional pages in an outbox of a browser running at the computer system.

32. The computer system of claim 30 further comprising means for setting a flag in a browser to launch and upload the completed transactional pages with user input when reconnected to the network.

33. The computer system of claim 31 further comprising:
 means for determining a first time value when the accessed required data is downloaded;
 means for determining a second time value when the wizard is run;
 means for comparing the difference between the second time and the first time; and
 means for displaying an indication to reconnect on-line to get more current data if the difference is greater than a predetermined amount.

34. The computer system of claim 30 further comprising means for automatically submitting the completed pages of the application to the server when the client is reconnected to the network.

35. A computer system, comprising:
 a bus system;
 a communications unit connected to the bus system;
 a memory, connected to the bus system, having locations for storing i) a wizard having database accesses required by a server transactional application and interdependencies amongst dynamic displayable pages of the application, ii) pages of the application, and iii) applicable data from at least one of the required database accesses, and locations for storing a set of instructions; and a processing unit connected to the bus system, wherein the processing unit executes the set of instructions to run the wizard, while disconnected from a network, to enable the transactional pages of the application to be completed by i) providing the applicable data; ii) playing back the pages of the application in a sequence dependent upon the interdependencies and in response to user input received while running off-line; and iii) receiving user input.

36. The computer system of claim 35 further comprising means for automatically submitting the completed pages of the application to a server computer system when reconnected to the network.

* * * * *